United States Patent [19]
Kikuchi

[11] Patent Number: 5,828,326
[45] Date of Patent: Oct. 27, 1998

[54] METHOD OF ENCODING AND DECODING FOR DATA TRANSMISSION

[75] Inventor: Hidekazu Kikuchi, Kanagawa, Japan

[73] Assignee: Sony Corporation, Japan

[21] Appl. No.: 762,449

[22] Filed: Dec. 9, 1996

[30] Foreign Application Priority Data

Dec. 15, 1995 [JP] Japan ..................... 7-347780

[51] Int. Cl.[6] ............................................. H03M 7/00
[52] U.S. Cl. ........................... 341/99; 341/50; 341/59; 341/63
[58] Field of Search ................... 341/55, 58, 59, 341/61, 95, 99, 101, 106, 50, 63

[56] References Cited

U.S. PATENT DOCUMENTS

| | | | |
|---|---|---|---|
| 4,549,167 | 10/1985 | Kato et al. ................ | 340/347 DD |
| 4,599,722 | 7/1986 | Mortimer .................. | 371/37 |
| 4,672,362 | 6/1987 | Furukawa et al. ........ | 340/347 DD |
| 4,728,929 | 3/1988 | Tanaka ..................... | 340/347 DD |
| 4,779,712 | 10/1988 | Van Gestel ................ | 341/59 |
| 4,866,636 | 9/1989 | Fukami et al. ............ | 364/514 |
| 5,144,305 | 9/1992 | Gotz et al. ................ | 341/73 |
| 5,264,942 | 11/1993 | Shimotsuji et al. ....... | 358/261.1 |
| 5,486,827 | 1/1996 | Shimizume et al. ...... | 341/58 |

*Primary Examiner*—Marc S. Hoff
*Assistant Examiner*—Jason L. W. Kost
*Attorney, Agent, or Firm*—Ronald P. Kananen

[57] ABSTRACT

In a method for transmitting digital data of images, etc., under the condition of n>m and k<n-m, when the synchronous data are not transmitted, the image data of "m" bits for the respective pixels are translated into the n-bit codes, of which identical logical bits do not continue more than or equal to "k" even if they are sequentially time-division multiplexed and transmitted with any combination, and then time-division multiplexed and transmitted. On the other hand, when the synchronous data are transmitted, the m-bit image data of the pixel is directly time-division multiplexed, and to this data, a serial code which is composed of "n-m" bits and including the specific bit string which is the continuous "k" bits of the identical logic is added. Thereby, making it possible to perform transmission and reception of the digital data and the synchronous data through one transmission line without a break of transmission or reception of the image data.

15 Claims, 5 Drawing Sheets

METHOD OF ENCODING AND DECODING FOR DATA TRANSMISSION

BACKGROUND OF THE INVENTION

1. Field of the Invention

This invention relates to an image data transmitting method and an image data receiving method, and more particularly, is applicable to the case where the image data is transmitted to a digital-control display device which is typified by a liquid crystal display device for displaying an image processed by a computer.

2. Description of the Related Art

As shown in FIG. 1, video signals S10 to S12 are transmitted to a liquid crystal display device 1. Video signals S10 to S12 which are the computer-processed digital image data of the three primary colors S1 to S6 which have been converted to analog with respect to each primary color. The liquid crystal display device 1 returns the video signals S10 to S12 to digital image data S13 to S18 by means of analog converters 5 to 7, and controls the display state of the image in real time.

In this method, there is a disadvantage in that the manufacturing cost of the liquid crystal display device increases, because high-speed multi-bit analog-to-digital converters are required for an increase in the numbers of the displaying pixels or the gradations. For this reason, as shown in FIG. 2, such a method is adopted in a part that image data S21 to S26 which are processed in parallel in a computer are transmitted to a liquid crystal display device 10 in parallel.

As shown in FIG. 3, in the case where image data S27 to S32 are transmitted in parallel through a transmission cable 13 of which plural conductors have been bundled, a skew (synchronous shifting) S34 of (F) in the figure or a crosstalk S35 of (G) in the figure may be generated due to a mutual interference among the transmitted image data S27 to S32. Therefore, there have been problems such as the transmission capacity and the transmission distance of the transmission cable 13 are restricted, and the sizes of the transmission cable 13 and the connector are increased.

To avoid such problem, it has been proposed to serialize the image data and then transmit it. By this method, it is possible to eliminate the skew or the crosstalk of the image data and transmit the image data.

However, as shown in FIG. 4B, according to the serialization, the image data of the respective pixels (0,0) to (X,Y) of one frame of the image signal have been translated into the serial image data wherein a certain number of bits become one word. In this connection, as shown in FIG. 4A, one frame of the image is comprised of X pixels and Y pixels, respectively, in the horizontal direction and the vertical direction.

In this translating method, it has been required to add control data which is referred to as a header to the image data, so as to establish word synchronization at the time of returning the received serial image data into the image data of the respective pixels.

However, one word of this header has been comprised of a different number of bits from the number of bits which composes one word of the image data. So, there is a disadvantage in that the construction becomes complicated, due to the fact that the image control circuit in the liquid crystal display device is required to distinguish a header, the word length of which is different, from the serial image data and to take it out.

In this method, there has been a problem in that the image data are broken when the header is taken out, and so stabilized reception can not be performed. Besides, in the method for transmitting the digital image data in parallel, there has been such a disadvantage that the respective dedicated cables are separately required for transmission of the vertical synchronous data and the horizontal synchronous data, in addition to the cable for transmission of the image data, therefore, the sizes of the connector and the transmission cable become large and the handling is complicated.

SUMMARY OF THE INVENTION

In view of the foregoing, an object of this invention is to provide an image data transmitting method and an image data receiving method which can transmit and receive the image data and the synchronous data through one transmission line without a break of transmission or reception of the image data.

The foregoing object and other objects of the invention have been achieved by an image data transmitting method of time-division multiplexing the image data which are comprised of m-bit data formed for respective pixels and the synchronous data which set the synchronous timing of the image data and then transmitting them in series. The processing at the time when only the m-bit data is to be transmitted and the processing at the time when the m-bit data and the synchronous data are to be transmitted are performed with the different procedures, and then, in both cases, the transmission is performed with n-bit form. When the synchronous data are not transmitted, such "n" and "k" are set that n>m and k<n-m, and the m-bit data for each pixel is translated into the n-bit data code on the basis of the coding translation table which has caused the n-bit data code and the m-bit data to correspond to each other, wherein the n-bit data codes have been selected such that the identical logical bits do not continue more than or equal to "k" even if any combination of them are time-division multiplexed and transmitted sequentially, and then the n-bit data code is time-division multiplexed and transmitted. When the synchronous data are transmitted, the m-bit data for each pixel is directly time-division multiplexed, and a serial code which is comprised of n-m bits and including the specific bit string, which is the continuous "k" bits of the identical logic, is added to the time-division multiplexed m-bit data, and then transmitted.

Under the condition of n>m and k<n-m, when the synchronous data are not transmitted, the m-bit image data for the respective pixels are translated into the n-bit codes and then time-division multiplexed and transmitted, in which the identical logical bits of the n-bit codes do not continue more than or equal to "k" even if any combination of which are sequentially time-division multiplexed and transmitted. On the other hand, when the synchronous data are transmitted, the m-bit image data of the pixel is directly time-division multiplexed, and to this data, a serial code which is comprised of n-m bits and including the specific bit string which is the continuous "k" bits of the identical logic is added, so that the image data and the synchronous data can be transmitted and received through one transmission line without a break of transmission or reception of the image data.

Besides, in the present invention, the n-bit serial data code is processed through the different procedures according to whether the specific bit string, which is the continuous "k" bits of the identical logic, has been detected from the n-bit serial data code which has been received via the transmission line or not. Such "n", "m" and "k" are set that n>m and k<n-m. When the specific bit string, which is the continuous "k" bits of the identical logic, has been detected from the n-bit serial data code which has been received through the transmission line, the synchronous timing is set for the m-bit image data for each pixel which is obtained from the n-bit serial data code, and the m-bit data, which has been obtained by eliminating the continuous n-m bits which are including the specific bit string from the n-bit serial data code, is returned to the m-bit image data of the first pixel on the scanning line. When the specific bit string, which is the continuous "k" bits of the identical logic, is not detected from the n-bit serial data code, "n", "m" and "k" are set, and the n-bit serial data code is decoded into the "m" bits, on the basis of the coding translation table which causes the n-bit data codes and the m-bit data to correspond to each other, wherein the n-bit data codes have been selected such that the identical logical bits do not continue more than or equal to "k" even if they are time-division multiplexed and transmitted sequentially with any combination of them, and also on the basis of the synchronous timing, and then returned to the image data which is comprised of the m-bit data for each pixel.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

The constitution of an image display system of the first embodiment according to the present invention will be described.

Figure 1:
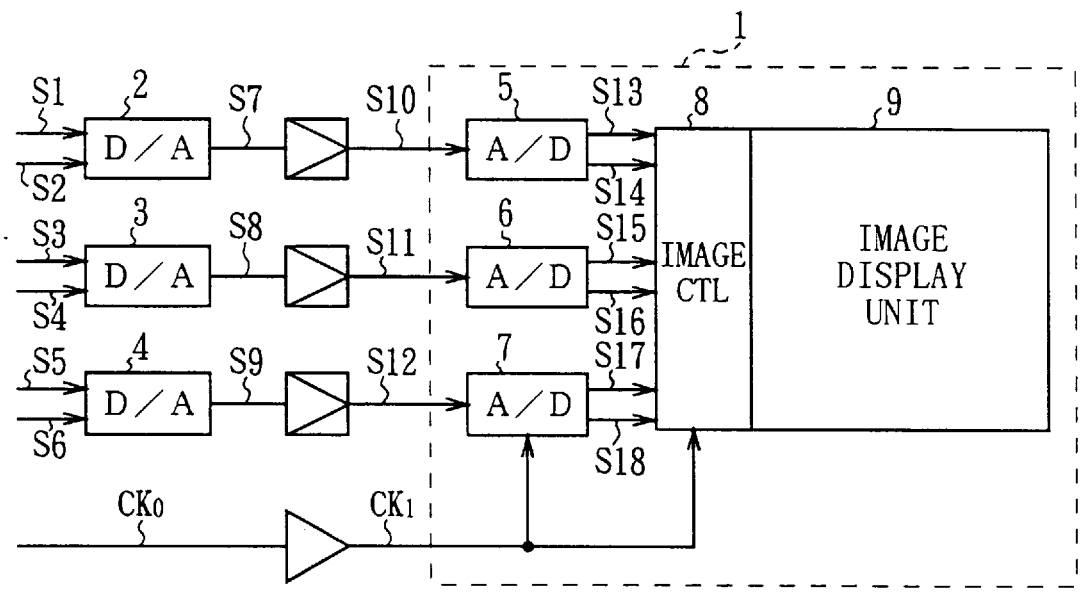
FIGS. 1 and 2 are schematic diagrams showing the method for transmitting the image data according to the related art.
Figure 2:
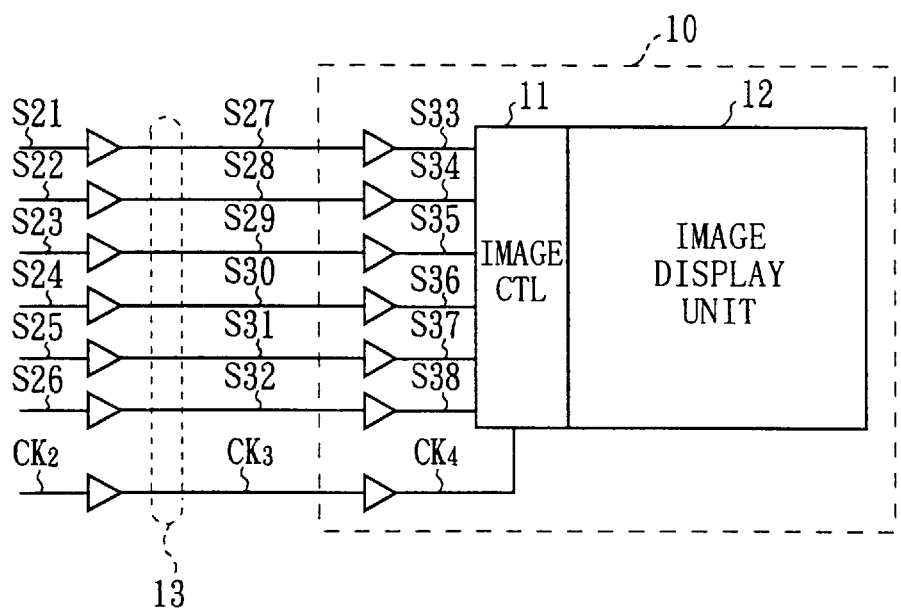
Figure 3:
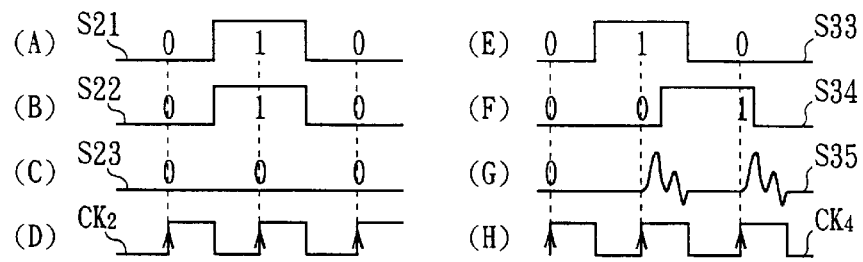
FIG. 3 is a wave-form chart showing the skew and the crosstalk due to parallel transmission.
Figure 4A:
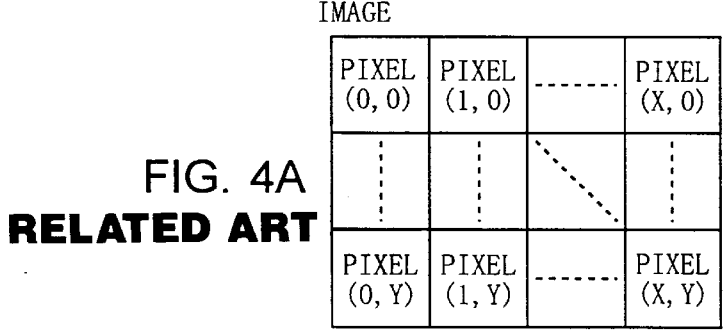
FIGS. 4A and 4B are schematic diagrams showing the pixel layout, and the image data arrangement based on the serialization.
Figure 4B:
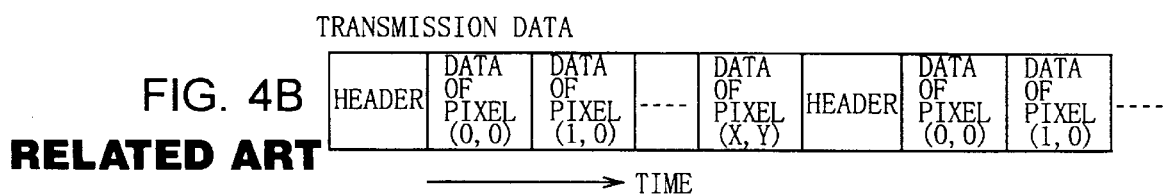
Figure 5:
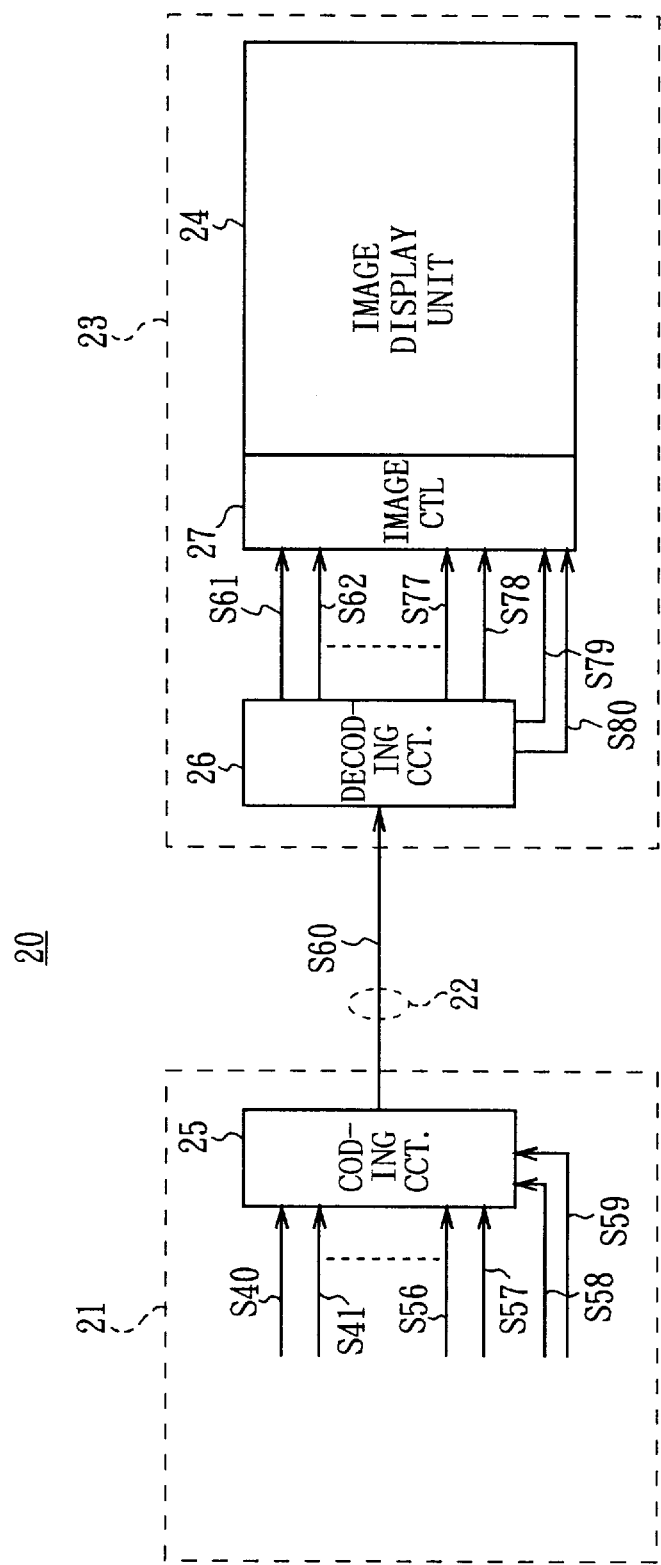
FIG. 5 is a schematic block diagram illustrating a constitution of an image display system according to the first embodiment of the image data transmitting method and the image data receiving method of the present invention.

FIG. 5 shows, as a whole, an image display system 20. In a main body 21, a data clock S40, m-bit parallel image data S41 to S57, and their synchronous data S58 and S59 are superimposed by time-division multiplexing, hereby n-bit serial data code S60 is created. The image display system 20 gives the data code S60 to a liquid-crystal display device 23 via a transmission cable 22 which is one transmission line, and then returns the data code S60 into a data clock S61, m-bit parallel image data S62 to S78, and their synchronous data S79 and S80.

By this, the image display system 20 controls, in real time, the display state of the time when the image which is being processed in parallel in the main body 21 is displayed on an image display part 24 of the liquid-crystal display device 23, without a break of the image data of the respective pixels.

The main body 21 is controlled by a micro-computer (not shown), and developing the image data given from the exterior on the video-RAM (not shown). The main body 21 gives the m-bit parallel image data of the respective pixels on the video-RAM to a coding circuit 25 which is constructed with integrated circuits, in the form of the image data S40 to S57 which are comprised of the respective bits. So, the main body 21 translates the "m" bits of each pixel into the n-bit code on the coding circuit 25, where m<n, and generates the data code S60 wherein the respective n-bit code composes one word.

However, at the time of transmission of the synchronous data S58 and S59, the main body 21 codes, on the coding circuit 25, the synchronous data S58 and S59 into the n-m bit code including the specific bit string which is the continuous "k" bits of the identical logic, where k<n-m. At this time, the main body 21 stops coding of the image data of the pixel. Then, the main body 21 adds the n-m bit code which represents the synchronous data S58 and S59 to the top of the m-bit image data which has been not coded, on the coding circuit 25, so that a word is constructed with "n" bits as with the other words.

The liquid-crystal display device 23 derives the synchronous data from the serial data code S60 on the decoding circuit 26 which is constructed with integrated circuits, sections the data code S60 into the respective n-bits at the timings which are based on the synchronous data, and segregates the respective words. All words of the data code S60 are comprised of n-bit respectively, therefore, a circuit for segregating the words placed in the decoding circuit 26 can be simply constructed. The liquid-crystal display device 23 returns the respective words from n-bit code into "m" bits on the decoding circuit 26, and gives the parallel image data S61 to S78 which are comprised of the respective bits of the "m" bits to the image control circuit 27.

When the specific bit string, which is the continuous "k" bits of the identical logic, has been detected from the n-m bits of the forefront of the word on the decoding circuit 26, the liquid-crystal display device 23 decides that the synchronous data should have been obtained. So, the liquid-crystal display device 23 creates the vertical synchronous data S79 and the horizontal synchronous data S80 in accordance with the specific bit string, on the decoding circuit 26, and gives them to the image control circuit 27.

Then, the liquid-crystal display device 23 gives the "m" bits, which have been obtained by eliminating the n-m bit code which includes the specific bit string, to the image control circuit 27, without decoding on the decoding circuit 26. By this, the liquid-crystal display device 23 controls the timing of the uninterrupted m-bit parallel image data S61 to S78 on the image control circuit 27, on the basis of the vertical synchronous data S79 and the horizontal synchronous data S80, and causes the image display part 24 to display the image.

Figure 6:
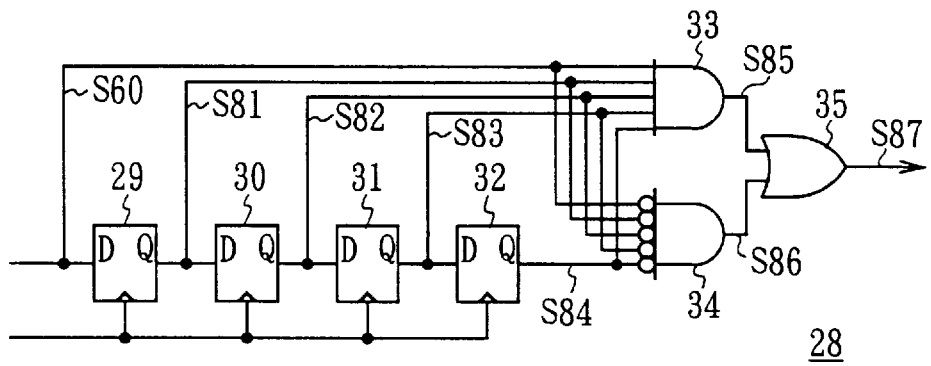
FIG. 6 is a connection diagram explaining the synchronous data detecting circuit.

In the case where k=5, the decoding circuit 26 has a synchronous data detecting circuit 28 shown in FIG. 6, and gives the serial data code S60 to the synchronous data detecting circuit 28, so as to detect the specific bit string which is the continuous "k" bits of the identical logic. The synchronous data detecting circuit 28 delays the data code S60 sequentially by means of four D flip-flops 29 to 32, so as to create the delayed image data S81 to S84 which have been delayed by one clock period to four clock periods respectively.

The synchronous data detecting circuit 28 gives the current data code S60 and the delayed image data S81 to S84 to an AND circuit 33 and a NAND circuit 34, as the condition inputs.

The synchronous data detecting circuit 28 gives the output S85 of the 4-input AND circuit 33 and the output S86 of the 4-input NAND circuit 34 to an OR circuit 35, as the condition inputs. In this way, the synchronous data detecting circuit 28 is able to detect the specific bit string which is the continuous five logic "1" of the data code S60, and to detect the specific bit string which is the continuous five logic "0".

Next, the method of the image data translation according to the second embodiment of the present invention will be described.

When the "m" bits are translated into the n-bit code on the coding circuit 25, the main body 21 performs the translation employing the stated translation table, such that the data code S60 satisfies the first to the fourth conditions shown below. The liquid-crystal display device 23 employs the stated translation table, so as to perform the inverse translation of the n-bit codes of the respective words of the data code S60 into the "m" bits.

In this stated translation table, only n-bit arbitrary logic array is adopted so that the maximum continuation number "j" of the identical logic bit satisfies j<k in all combinations of the n-bit codes at the time of translation of the "m" bits into the n-bit code. Also, by this stated translation table, arbitrary "m" bits and an arbitrary n-bit code are caused to correspond to each other without overlapping.

In addition to the first to the fourth conditions described later, the coding circuit 25 constitutes the respective words of the serial data code S60 with "n" bits at all times, as stated above, and causes all words to include the pixel data, and processes the transmission of the pixel data in an uninterrupted manner.

The first condition is that the data code S60 includes a great deal of data transitions in order to ease extraction of the clocks from the serial data code S60. The second condition is that the proportion of logic "1" with logic "0" of the data code S60 is even or near to even. The third condition is that the data code S60 possesses such a characteristics that the delimiter of the respective words can be detected when the n-bit code of the data code S60 is to be returned to the "m" bits. The fourth condition is that the number of the added bits is less than that of the original data, when redundant bits are added to the original data for the purpose of serialization.

The first condition is needed to extract a clock, that is, a signal for indicating the timing to cut out the logic "0" and the logic "1" of the serial data from the serial data code S60, the voltage of which repeats rising-up and falling-down, on the decoding circuit 26. The decoding circuit 26 extracts the clock by means of a phase locked loop (PLL) circuit or a SAW filter resonator, etc. However, if data transitions are not enough, the PLL circuit tends to detune, and the output of the filter is lowered. For this reason, it is desirable that one or more data transitions should occur with every four to five bits.

For instance, in a raw image data which have been obtained by imaging the imaging object, an image data corresponding to a perfect black image which is displaying black color on the whole surface of the display screen is possible, therefore, data transitions may be greatly decreased. For this reason, at the time of translation of the parallel image data into serial, the original image data is commonly coded into some data string, and data transitions are increased.

To increase data transitions, scramble or m-bit n-bit translation is employed. The former is a method for probabilistically inhibiting occurrence of such a data that the identical logical bits continue for a long time, using a pseudo-random number generating circuit. The latter is a method for generating data transitions by force, by translating the original m-bit data into n-bit data in accordance with a certain rule. On the receiving side, the original data are reproduced by inverse translation of those.

The second condition is a condition for ensuring the receiving margin, that is, for reproducing the DC level with ease, against attenuation or distortion of the signal waveform which are generated in the process of transmitting the serial data at a high transmission rate. To satisfy this second condition, it is desirable that the ratio of logic "1" to logic "0" should be within 1:7 to 7:1.

The third condition is a condition for detecting the timing to cut out a multi-bit data (word) which has been one set as the pixel data of a certain time point on the transmitting side, as one set on the receiving side. To satisfy the third condition, a data string including the specific bit string which do not exist absolutely in the other part of the serial data or vary rarely exists, that is, a header is inserted in somewhere of the serial data, usually. By this header which is a serial code, the timing to cut out a word can be transmitted from the transmitting side to the receiving side. As stated above, the coding circuit 25 inserts the n-m bit code including the specific bit string which is the continuous "k" bits of the identical logic as the header, so as to transmit the synchronous timing.

The fourth condition is such that the bits which are added for the purpose of satisfying the abovementioned third condition, for instance the bits which are increased with m-bit n-bit translation or the bits of the header, are less than the original data. The fourth condition is a condition for suppressing excessive rising of the transmission rate of the serial data and for alleviating the burden of the serial transmission hardware, and 1.4 times the original data or below is desirable.

Next, the operation of the embodiment of the present invention will be described.

By way of example, it is assumed that the horizontal pixel number and the vertical pixel number of the display screen of the liquid-crystal display device 23 are respectively 1,024 and 768, and the respective gradations of red, green and blue are displayed with 6 bits for each pixel, and 262,144 colors of 6×3=18 bits are displayed. It is further assumed that the display rate is 80 [picture/sec], and the synchronous data is comprised of the vertical synchronous data and the horizontal synchronous data. To realize such displaying, the main body 21 is required to give the image control circuit 27 the image data of the pixels of 80 [picture/sec]×1,024 [column] ×768 [row]≈62.9×$10^6$ [piece/sec].

Figure 7:
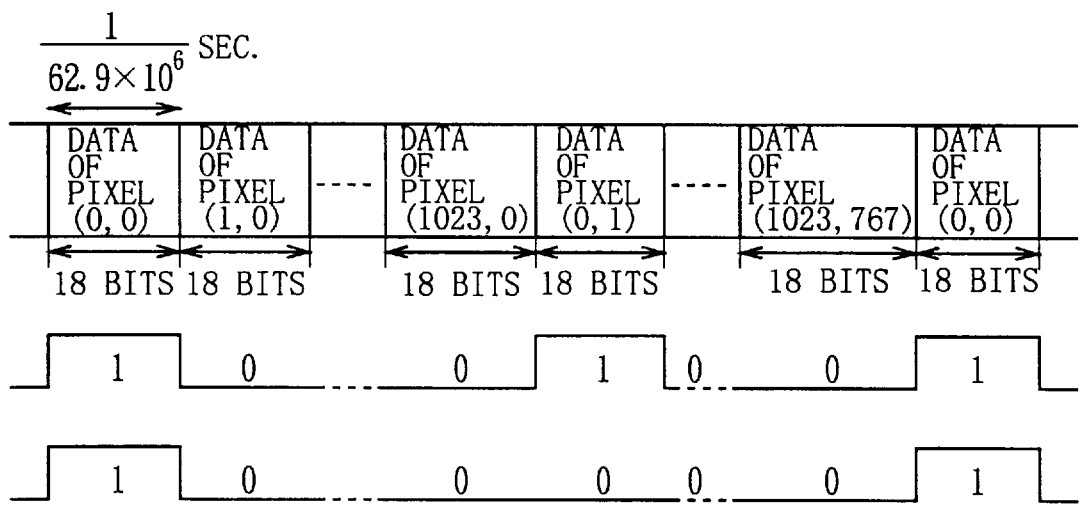
FIG. 7 is a timing chart showing the timing method of the parallel image data of the respective pixels and the synchronous data according to the second embodiment.

At this time, as shown in FIG. 7, the main body 21 translates, for each one frame of the image, the 18-bit image data of the respective pixels which range from the first pixel on the scanning line (0, 0) to the last pixel (1023, 767) into 24-bit data codes, independently or along with the horizontal synchronous data and the vertical synchronous data, in accordance with the different procedures which depend on the logic level of the synchronous data, and then transmits them.

Next, the method of data code translation according to the third embodiment of the present invention will be described.

First, an explanation is given of the case where the horizontal synchronous data and the vertical synchronous data are in logic "0" level (hereinafter, this is referred to as that the synchronous data are inactive). At this time, the main body 21 sections the 18-bit image data of each pixel into 3-bits, on the coding circuit 25, and then translates them into 4-bit codes, causing the respective 3-bits to correspond to the 4-bit codes in accordance with the translation table TBL1, shown in FIG. 8, which is a coding translation table.

Then, the main body 21 sequentially arranges six 4-bit codes which have been obtained in response to the 18-bit, in series, so as to create a word of the 24-bit code. In this way, the image data for each pixel have been translated from 18-bit to 24-bit. Where, m=18, and n=24, and so m<n is satisfied.

In this connection, the 4-bit codes "0010", "0011", "0101", "0110", "1001", "1010", "1011" and "1100" which are lying on the translation table TBL1 can be caused to correspond to arbitrary 3-bit data, respectively.

Next, an explanation is given of the case where the horizontal synchronous data or the vertical synchronous data are in 1 (hereinafter, this is referred to as that the synchronous data are active). As shown in FIG. 7, this case includes such a state that only the horizontal synchronous data is in logic "1" and also such a state that the horizontal synchronous data and the vertical synchronous data are in logic "1" concurrently.

When the synchronous data are active, the main body 21 places the 18-bit image data behind the header which is comprised of the 6-bit (=n-m) code in sequence, so as to create a 24-bit code, on the coding circuit 25. When only the horizontal synchronous data is in logic "1", the main body 21 constitutes a header with the bit string "100000", on the coding circuit 25. On the other hand, when both synchronous data are in logic "1", the main body 21 constitutes a header with the bit string "011111", on the coding circuit 25.

Accordingly, a header includes the specific bit string in which the logic "0" or the logic "1" continues by five. Thus, "k" becomes "5", and so it satisfies k<n-m. In this way, as shown in FIG. 9, the main body 21 translates the 18-bit image data, along with the header, into the 24-bit codes, and sequentially couples them up, so as to create the serial data code S60 in which the image data of the respective pixels are not broken.

Figures 8, 9:
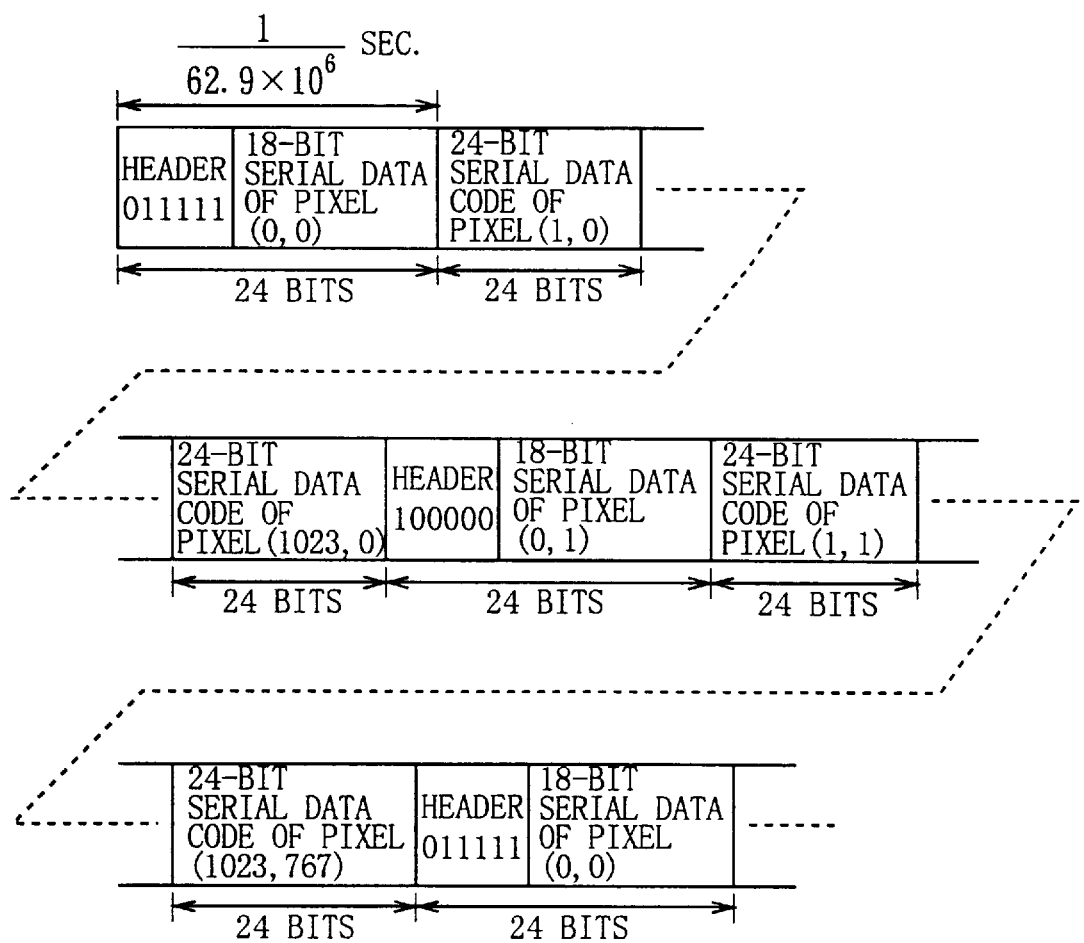
FIG. 8 is a diagram showing the translation table which has caused the 3-bit data and the 4-bit codes to correspond to each other according to the third embodiment.
FIG. 9 is a schematic diagram showing the data arrangement of the serial image data.

Next, it is explained that the serial data code S60 shown in FIG. 9 satisfies the abovementioned first to fourth conditions. At first, it is known that the words which are corresponding to the cases where the synchronous data are inactive occupy an overwhelming proportion (1023/1024) out of 1024 words which constitute the serial data code S60. In the translation table TBL1 shown in FIG. 8, data transitions of the 4-bit codes occur at least one time. By this, the serial data code S60 occurs the data transitions in the probability of 25% or more as a while, therefore, the clocks can be easily extracted, and the first condition is satisfied.

Besides, in even a code which has most one-sided to logic "1" or to logic "0" out of the 4-bit codes of the translation table TBL1, the ratio of logic "1" to logic "0" is 1:3. So, if the image data have been wholly translated into the specific 4-bit code, the ratio of logic "1" to logic "0" is limited to 1:3 to 3:1. Therefore, the DC level can be easily reproduced with respect to the data code S60, and so the second condition is satisfied.

Next, even though any 4-bit codes on the translation table TBL1 are combined in some order and arranged in series, logic "1" do not continue by five or more, and also logic "0" do not continue by five or more. Accordingly, when the specific bit string which is the continuous five logic "1" or the continuous five logic "0" has been detected from the forefront six bits of the 24-bit code, the liquid-crystal display device 23 is able to decide that the header should has been inserted therein and that the timing when the synchronous data are active should has been transmitted.

Accordingly, the liquid-crystal display device 23 is able to employ the header as the reference for establishing the word synchronization for recognizing the delimiters of the serial data code S60, one word of which is twenty-four bits, and for returning the n-bit serial codes into the m-bit parallel image data S61 to S78, without interruption of the image data of the pixels. The liquid-crystal display device 23 is always able to steadily receive the image data of the pixels, as the image data of the pixels are not broken even during the time when the header is being received.

Even if the image data have been broken during transmission of it, the liquid-crystal display device 23 is able to easily obtain the synchronous timing for the new horizontal scanning line, by detecting the specific bit string. In this way, the data code S60 satisfies the third condition.

It is not necessary to count the words of the header and the words of the image data in a separated manner, as the lengths of the every words of the data code S60 are identical, therefore, the circuit for counting the words can be simply constituted.

In this connection, when the synchronous data is active, the 18-bit image data which has been not translated is transmitted, subsequently to the header. It is possible that five or more logic "1" accidentally continue or five or more logic "0" accidentally continue, by the 18-bit image data. Therefore, after the specific bit string placed in the header has been once detected at the synchronous data detecting circuit 28, the detecting function of the synchronous data detecting circuit 28 is intermitted until, at least, it is switched to the next word, so that it is able to prevent incorrectly detect the timing when the synchronous data is activated.

Lastly, the data of each pixel of the data code S60 has been increased by 6 bits in comparison with the original image data. The transmission rate of the data code S60 of this time becomes $62.9 \times 10^6 \times 24 = 1.51 \times 10^9$ [bit/sec]. On the other hand, the transmission rate of the original image data becomes $62.9 \times 10^6 \times 18 = 1.13 \times 10^9$ [bit/sec]. The ratio of the transmission rates of the data code S60 to the original image data becomes 1.33, and do not exceed 1.4 times of the original data. This ratio is permitted in practice, from the point of view of the burden of the hardware. In this way, the data code S60 satisfies the fourth condition.

According to the above constitution, under the condition of n>m and k<n-m, when the synchronous data are not transmitted, the m-bit image data for the respective pixels are translated into the n-bit codes and then transmitted in series, in which even if any combination of the n-bit codes are sequentially transmitted in series the identical logical bits do not continue more than or equal to "k", on the other hand, when the synchronous data are transmitted, the m-bit image data of the pixel are directly arranged in series without being coded, and to this data, a header which is comprised of the serial n-m bits and including the specific bit string which is the continuous "k" bits of the identical logic is added, so that the parallel image data and the synchronous data can be transmitted and received through one transmission cable 22 without a break of transmission or reception of the parallel image data.

Accordingly, it is possible to further increase the transmission distance of the image data to the liquid-crystal display device 23 in comparison with the cases of parallel digital or analog transmissions.

It is also possible to transmit the image data by means of a low-cost small-sized connector and a large flexible transmission cable which is the only needed cable.

Next, the other embodiments of the present invention will be described.

In the above embodiment, the description has been given of the case where m=18, n=24, k=5, and j=4. However, the present invention is not only limited to this case, but under the condition of n>m, k<n-m, and j<k, n, m, k, and j may be set to arbitrary numbers.

Further, in the above embodiment, the description has been given of the case where at the time when the 18 bits are translated into a 24-bit code, 3 bits are translated into a 4-bit code, and the 4-bit codes are combined so as to obtain a 24-bit code. However, the present invention is not limited to this case, but is applicable also to the case where the arbitrary number of bit codes are combined so as to obtain a code which has the desired number of bits.

Further, in the above embodiment, the description has been given of the case where a liquid-crystal display device is employed. However, the present invention is not only limited to this case, but is applicable to also the case where an arbitrary image display device in which the image is controlled by the digital signal, such as a plasma display is employed.

Furthermore, in the above embodiment, the description has been given of the case where the serial data code S60 is transmitted through the transmission cable 13. However, the present invention is not only limited to this case, but is applicable to such a case that the serialized image data are transmitted with electronic radio waves or infrared rays.

As described above, according to the present invention, under the condition of n>m and k<n-m, when the synchronous data are not transmitted, the m-bit image data for the respective pixels are translated into the n-bit codes and then time-division multiplexed and transmitted, in which even if any combination of the n-bit codes are sequentially time-division multiplexed and transmitted the identical logical bits do not continue more than or equal to "k", on the other hand, when the synchronous data are transmitted, the m-bit image data of the pixel is directly time-division multiplexed, and to this data, a serial code which is comprised of n-m bits and including the specific bit string which is the continuous "k" bits of the identical logic is added, so that the image data transmitting method and the image data receiving method can be realized wherein the image data and the synchronous data can be transmitted and received through one transmission line without a break of transmission or reception of the image data.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A digital data transmitting method for transmitting digital data and synchronous data for timing said digital data, said transmitting being in words having constant length of "n" bits, the method comprising:
   providing said digital data in word lengths of "m" bits, wherein n>m;
   periodically providing said synchronous data in word lengths of "k" bits, wherein k<n-m;
   determining if said synchronous data is provided;
   if said synchronous data is not provided, coding said digital data into words with a length of "n" bits, and multiplexing and transmitting said coded data; and
   if said synchronous data is provided, combining said digital data and said synchronous data into words with a length of "n" bits, and multiplexing and transmitting said combined data.

2. The digital data transmitting according to claim 1, wherein said referencing a translation table further comprises providing a translation table in which said longer portions of a word of "n" bits are selected such that consecutive identical logical bits do not exceed or equal "k" regardless of how said longer portions are sequenced.

3. The digital data transmitting method according to claim 2, wherein said combining further comprises adding said synchronous data in front of said digital data.

4. The digital data transmitting method according to claim 2, wherein said synchronous data are vertical synchronous data and horizontal synchronous data for an image signal.

5. The data transmitting method according to claim 1, wherein said m-bit data is an image signal and each m-bit word of said m-bit digital data represents a pixel of said image data.

6. The digital data transmitting method according to claim 5, wherein said combining further comprises adding said synchronous data in front of said digital m-bit words.

7. The data transmitting method according to claim 5, wherein said synchronous data are vertical synchronous data and horizontal synchronous data.

8. The digital data transmitting method according to claim 1, wherein said combining further comprises adding said synchronous data in front of said digital data.

9. The digital data transmitting method according to claim 1, wherein said digital data is image data and said synchronous data are vertical synchronous data and horizontal synchronous data.

10. The digital data transmitting method according to claim 1, wherein said coding further comprises referencing a translation table which equates portions of a word of "m" bits with longer portions of a word of "n" bits.

11. The digital data receiving method according to claim 1, further comprising receiving said transmission of coded or combined n-bit data, and
   recognizing said combined data by determining that said received n-bit data contains "k" consecutively identical data bits, wherein
   if said n-bit data does not contain "k" consecutively identical data bits, said method further comprises decoding portions of said coded n-bit data into portions of said m-bit data with said translation table.

12. A digital data receiving method comprising:
   setting "n", "m" and "k" such that n>m and k<n-m;
   receiving digital data transmissions through a transmission line in word lengths of "n" bits; and
   determining individual logic bits in said received transmission;

wherein, when "k" identical logic bits are consecutively determined in the n-bit data which has been received through the transmission line, synchronous timing data of an m-bit digital data signal is obtained by decoding a portion of said n-bit data received through the transmission line, and said m-bit digital data is obtained from a second portion of said n-bit data received through the transmission line.

13. The digital data receiving method according to claim 12, wherein said portion of said n-bit data from which said synchronous data is obtained is a front portion of said n-bit data.

14. The digital data receiving method according to claim 12, wherein said synchronous data are vertical synchronous data and horizontal synchronous data of said m-bit data signal.

15. The digital data receiving method according to claim 12, wherein when said n-bit data does not contain "k" consecutively identical data bits, said method further comprises decoding portions of said n-bit data into portions of said m-bit data with a translation table.

* * * * *